United States Patent [19]

Boratgis et al.

[11] Patent Number: 4,737,982
[45] Date of Patent: * Apr. 12, 1988

[54] REPROGRAMMABLE CALL FORWARDING DEVICE

[76] Inventors: James P. Boratgis, 3100 Lee Hill Rd., Boulder, Colo. 80302; Gary J. Hale, 8077 So. Deer Creek Canyon Rd., Morrison, Colo. 80465

[*] Notice: The portion of the term of this patent subsequent to Jun. 2, 2004 has been disclaimed.

[21] Appl. No.: 931,245

[22] Filed: Nov. 17, 1986

Related U.S. Application Data

[62] Division of Ser. No. 601,866, Apr. 19, 1984, Pat. No. 4,670,628.

[51] Int. Cl.[4] .................. H04M 3/56; H04M 3/58
[52] U.S. Cl. ..................... 379/202; 379/212
[58] Field of Search ............... 4/69, 77, 211, 202, 4/204, 205, 206, 210, 212

[56] References Cited

U.S. PATENT DOCUMENTS 4,670,628 6/1987 Boratgis ................ 379/211 X

Primary Examiner—James L. Dwyer
Attorney, Agent, or Firm—Fields, Lewis, Pittenger & Rost

[57] ABSTRACT

A call forwarding device (11) for forwarding phone (15) that is connected by a single forwarding phone line (13, 14) to central exchange telephone equipment (12). Equipment (12) has an electronic switching system and provides three-way conference service to the forwarding phone. In the call forwarding mode, in response to a call from a calling phone (17) to the forwarding phone, the device has circuits including a ring detector (31), a hook condition simulator (29) and a sensor (31) that automatically operate to simulate an off-hook condition, to simulate a first hook switch flash condition, and operates to actuate a message transmitting and storage device (25) which generates telephone dialing pulses corresponding to the number of a third phone (21), and to simulate a second hook switch flash condition, whereby the calling phone is automatically connected by the equipment (12) to a third phone. In a reprogramming mode, circuits including a sensor (33) in combination with the device (25) operate so that the device (25) may be reprogrammed with any third phone number to change the telephone number to which the call is forwarded and reset for receiving the next call or a new phone number.

2 Claims, 2 Drawing Sheets

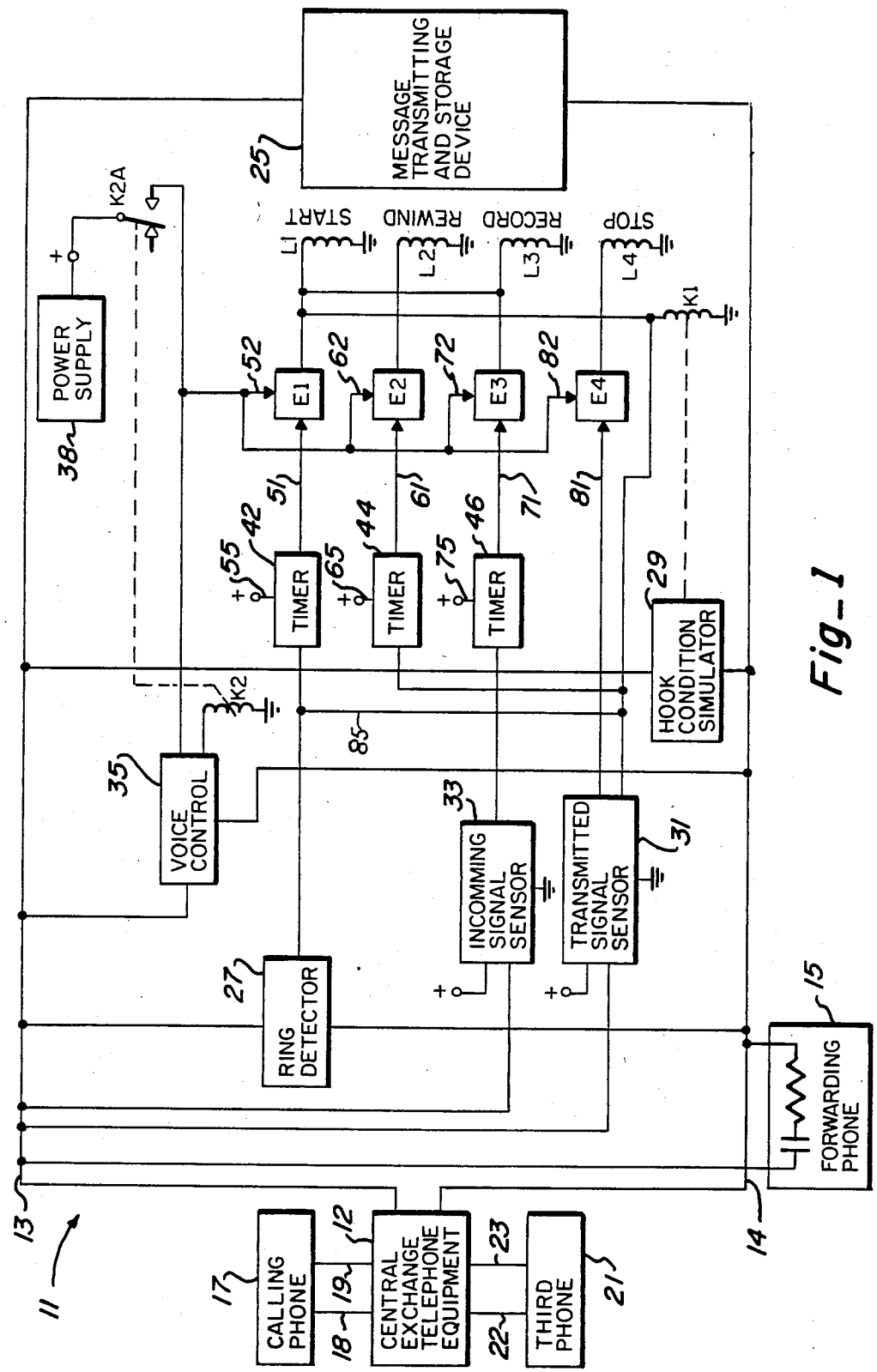
Fig_1

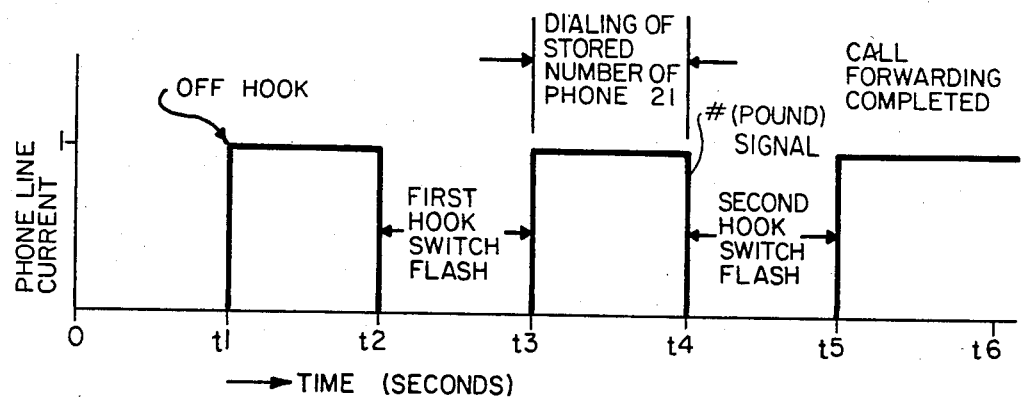
Fig_2
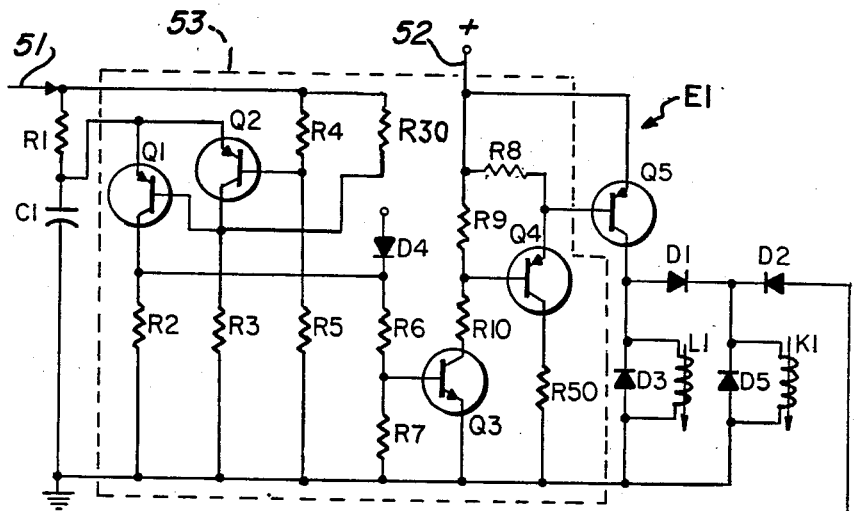
Fig_3
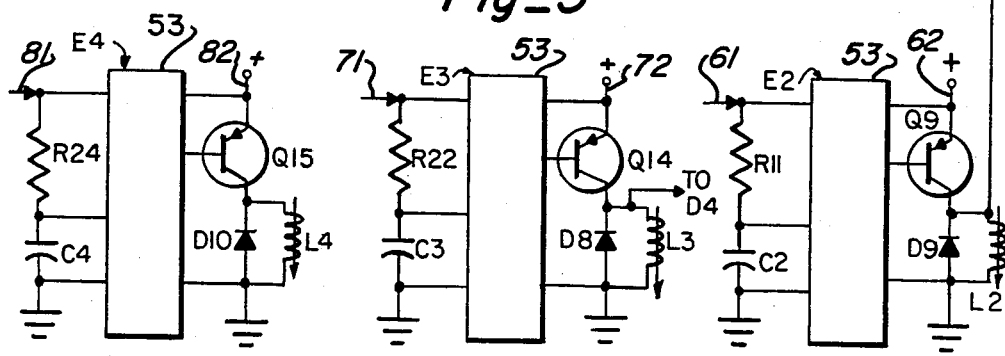
Fig_6  Fig_5  Fig_4

REPROGRAMMABLE CALL FORWARDING DEVICE

This application is a division of application Ser. No. 601,866, filed Apr. 19, 1984, now U.S. Pat. No. 4,670,628.

TECHNICAL FIELD

This invention relates to telephone systems and more particularly to an automatic call forwarding device that provides call forwarding from any selected forwarding phone having three-way conference service provided by a central exchange telephone equipment having an electronic switching system. This type of call forwarding is commonly referred to as call transfer.

BACKGROUND ART

Persons that are traveling from location to location during a workday have difficulty in being reached. There has been widespread use of phone answering devices but the drawback of these is that some people do not want to leave messages. Attempts have been made to provide call forwarding whereby a person out in the field with access to a phone may have his calls forwarded directly to his present location, which in operation does not require a person present at the forwarding phone. It is preferred to have this call forwarding accomplished in a relatively simple manner without the caller knowing that the transfer has been made.

Prior known call forwarding technology with remote programming change capability has required the use of a switch box at the forwarding phone and two telephone lines from the phone company to the switch box.

Engel U.S. Pat. No. 2,124,913 discloses a relay at the telephone exchange and a calling relay at the forwarding station that is energized by the caller so that, when a call is made by the calling station, the device at the forwarding station instructs the exchange to dial a different number.

Ballin et al. U.S. Pat. No. 3,510,598 discloses a telephone call diverter and answering device which answers a call with a greeting prerecorded on a storage drum. The new telephone number is also stored on the storage drum, and means are provided whereby a number is automatically dialed to connect the caller to the new number and for remotely changing the transfer number.

Sousa U.S. Pat. No. 3,959,600 discloses means for reprogramming the transfer number in a two-telephone line system.

Recently available services by some telephone companies provide call forwarding on a single line, but there are no known call forwarding devices presently available, using a single line, that are reprogrammable either remotely or locally.

DISCLOSURE OF INVENTION

An automatic call forwarding device is connected to a forwarding phone having a three-way conference service by a single phone line to central exchange telephone equipment having an electronic switching system and a three-way conference service. The device operates to cause the calling phone to be put on hold while a message transmitting and storage device transmits dialing pulses of another phone representing the number of that phone which the telephone company will recognize and the telephone equipment will operate to connect the calling phone to that third phone. The device is adapted to be reprogrammed by encoder signals provided by the tone pulses of a standard touch tone telephone or a hand encoder with identical tone pulses.

BRIEF DESCRIPTION OF DRAWINGS

The details of this invention will be described in connection with the accompanying drawings, in which:

FIG. 1 is a schematic diagram of a call forwarding device embodying features of the present invention;

FIG. 2 is a graph showing the sequence required for a call forwarding operation;

FIG. 3 is a schematic diagram of a first electronic circuit for causing the message transmitting and recording device to transmit messages;

FIG. 4 is a schematic diagram of a second electronic circuit for controlling the rewinding of the message transmitting and recording device;

FIG. 5 is a schematic diagram of a third electronic circuit for controlling the recording of the message by the message transmitting and recording device; and FIG. 6 is a schematic diagram of a fourth electronic circuit that controls the stop function.

DETAILED DESCRIPTION

Referring now to the drawings, in FIG. 1 there is shown a call forwarding device generally designated by numeral 11 embodying features of the present invention. Central exchange telephone equipment 12 is shown connected by a single phone line designated by numerals 13 and 14 to a forwarding phone 15. Device 11 is connected across the forwarding phone lines 13 and 14 so as to operate in parallel therewith.

For the purpose of explaining the present invention, there are shown in FIG. 1 a calling phone 17 coupled to the telephone equipment 12 by lines 18 and 19 and a third phone 21 coupled to the telephone equipment by lines 22 and 23.

The central telephone equipment 12 has an electronic switching system ESS and provides three-way conference service to the forwarding phone. This equipment has the capability of forwarding a call from a calling phone to a third phone when a certain sequence of operation is performed. This sequence involves moving the forwarding phone to an off-hook condition and the depressing of the switch hook of the forwarding phone for a certain time interval, after which the telephone equipment places the calling phone on hold. The number of a third phone to which the call is to be forwarded is then dialed at the forwarding phone and the switch hook of the forwarding phone is depressed a second time for a certain time interval, whereupon the telephone equipment will connect the calling phone to the third phone to complete the call forwarding operation.

Device 11 shown includes a message transmitting and storing device 25 connected across the forwarding phone line. Device 25 shown is a mechanical device such as a conventional phone answering device. Device 25 has a tape which serves as a storage medium on which tone signal messages may be stored. Device 25 has a transmit mode of operation that is effected when actuating a start button, after which stored messages are read out from the tape over the phone line and back to the telephone equipment.

Device 25 has a store mode of operation that is effected by actuating a record button, during which incoming tone signal messages over the phone line are stored on the tape. Device 25 further has a reset mode of operation that is effected by actuating a stop button and a rewind button, after which the storage means is reset for either storing a message or transmitting a stored message.

Device 25 may be reprogrammed and/or reset from any third phone in the telephone system having the tone pulses of a standard touch tone telephone or a hand encoder with identical tone pulses. The storage device can be, for example, a conventional telephone answering device, a tape recorder, or a solid state memory chip.

A start solenoid L1, rewind solenoid L2, record solenoid L3, and stop solenoid L4 are shown adjacent device 25 which upon energization serve to effect the actuation of the above described corresponding buttons on device 25.

Device 11 includes a ring detector 27 connected across the forwarding phone line which, in response to an incoming call from equipment 12, provides an output signal indicating that a call is being received from the equipment to the forwarding phone.

Device 11 further includes a hook condition simulator 29 connected across the forwarding phone line with a solenoid K1 that is selectively energized to change the state of the output therefrom. Simulator 29 is basically an impedance device that has one state at the output representing an off-hook condition at the forwarding phone and a second state representing a hook switch flash condition, which is essentially a short circuit. Device 11 has a transmitted signal sensor 31 connected across the forwarding phone line which, for example, may be a pound tone detector that will detect a selected tone at the end of the telephone number that has been transmitted from device 25.

Device 11 has an incoming signal sensor 33 associated with the reprogramming mode of operation and responsive to a reprogrammable message signal generated at the calling phone or locally. In the embodiment shown, sensor 33 is a tone detector which will detect the * (star) tone signal. The incoming signal sensor 33 includes a reprogram tone signal, a new telephone number to which the call is to be forwarded, and a reset tone signal whereupon, when the calling phone transmits the signal, a new number is stored in device 25 and the device is then reset for the next call or a new number.

Referring again to FIG. 1, the ring detector 27 is shown as having its output connected to a timer 42 and the timer by line 51 to an electronic circuit E1. The output of E1 is connected to start solenoid L1 and simulator solenoid K1. The output of the ring detector 27 is shown connected directly to solenoid K1. The transmitted signal tone sensor 31 has an output connected to coil K1 by line 85.

The transmitted signal tone sensor 31 has an output connected through a timer 44 which in turn connects to an electronic circuit E2 via line 61, in turn connecting to rewind solenoid L2. In the embodiment shown the sensor 31 is a tone detector that will detect the # (pound) tone signal. The incoming signal sensor 33 has a timer 46 connected to a third electronic circuit E3 via line 71 which controls the record solenoid L3. The output from sensor 31 connects to a fourth electronic circuit E4 which controls stop solenoid L4.

There is further provided a voice control circuit which is also connected across the forwarding phone line. This voice control circuit 35 is optional and in general operates to turn off the device 11 after there has been no voice on the line for a predetermined time interval. The voice control circuit controls a relay coil K2 which closes a normally open contact K2A upon energization.

A power supply 38 is shown as having an output designated + that biases the electronic circuits E1, E2, E3 and E4 via their associated timers as well as sensors 31 and 33. The power terminal + of the power supply 38 also applies a bias voltage to several of the circuits shown through contact K2A, as is described more fully hereinafter.

The call forwarding mode of operation will now be described, assuming the telephone number of a third phone has been recorded in device 25. With the device 11 in readiness for use, a call to the forwarding phone from the calling phone causes the telephone equipment 12 to produce voltage across lines 13, 14, which in turn will cause the bell of the forwarding phone 15 to ring, energize coil K2 via the voice control circuit 35, and close the normally open contact K2A.

In response to the first ring, then, contact K2A is closed. Contact K2A controls electric power from the power supply 38 to bias the voice control circuit 35 and electronic circuits E1, E2, E3 and E4. The ring detector 27 responds to the ring and initially energizes solenoid K1 to simulate an off-hook condition indicating to the equipment that the phone has been answered. This off-hook condition is a current flow of a certain magnitude in the power lines 13, 14 and represented on the graph of FIG. 2, beginning at time t1.

The output of ring detector 27 causes timer 42 to turn on for a preselected time interval such as approximately one second between t1 and t2. The timer 42 connects the voltage of the power supply 38 to a first electronic circuit E1, which causes the charging capacitor C1 described hereinafter to charge in readiness for use. After the initial energization of solenoid K1 there is a de-energization for a time interval between t2 and t3 of about one second which simulates a first hook switch flash, during which the equipment 12 places the calling phone on hold and the central equipment produces a dial tone to the forwarding phone.

At the end of the timer interval of timer 42, the power supply voltage is removed from the first electronic circuit E1. Because of a charge on the capacitor C1 and operation of the first electronic circuit E1, the capacitor D1 is discharged, resulting in energization of the coil of solenoid L1 and the coil of relay K1 for a time interval of about one second.

Energization of the solenoid L1 actuates the start storing operation of the device 25 to start same. During the time interval between t3 and t4 there is sufficient time to obtain the dial tone from equipment 12 and allow device 25 to transmit dialing pulses of a selected third phone number that have been recorded on the storage medium of device 25 and are received by the central office telephone equipment 12.

The occurrence of the pound pulse # is at the end of the transmission of the dialing pulses by device 25, designated t4. At this time a transmitted signal pulse, such as the pound pulse (#), triggers the sensor 31 to again actuate relay K1 for the second time for the required time interval in a second hook switch flash operation between intervals t4 and t5, thereby providing the sequence on the phone line that will cause the telephone equipment 12 to connect the calling phone to the selected third phone so that the call forwarding is now completed. The time intervals t1 through t5 are only approximate representations, with t3 to t4 typically being longer than t1 to t2.

The closure of contact K2A by the voice control circuit applies a charging voltage to a charging capacitor C2 in the second electronic circuit E2 so that it is in readiness for use. The transmit signal sensor 31 is connected to a timer 44 which in turn controls the activation of a rewind solenoid L2 via line 61.

At the end of the transmission of the dialing pulses by device 25, a transmitted signal pulse such as the pound pulse triggers the detector 31 to interrupt the power from the power supply to the circuit E2 so that this circuit is interrupted or turned off.

By virtue of the operation of the second electronic circuit E2, a capacitor C2 in circuit E2 is discharged and solenoid L2 is activated for about one second. Activation of solenoid L2 starts a rewind cycle.

As above mentioned, the voice control circuit 35 is activated to actuate rewind solenoid L2 and relay K2A is energized and remains energized in response to a voice on the line, so contact K2A is closed. After the voice is removed for a time period of about eight seconds, coil K2 is de-energized and contact K2A opens, the power is removed from electronic circuits E1 through E4 and the voice control circuit, and the device is reset for the next call.

The reprogramming operation will now be described. Assuming the device 25 has been reset for reprogramming, a calling phone has a reprogramming operator that first inputs a particular program signal, which in the present example is the * (star) tone signal, that operates record solenoid L3. The new telephone number is dialed by the calling phone and this is recorded by device 25. At the end of transmission of the new telephone number, a transmitted signal tone such as, for example, the # (pound) tone is added by the reprogramming operator to operate the solenoid L4 to stop device 25.

A third electronic circuit E3 receives power from the power supply 38 via a timer 46. Circuit E3 has a charging capacitor C3. The incoming signal tone sensor 33 connects to timer 46, which in turn connects via line 71 to circuit E3 and circuit E3 to record solenoid L3. When a star tone is received as, for example, from any calling phone, circuit E3 operates and solenoid L3 is energized for approximately one second to press the record button and simultaneously solenoid L1 is activated to press the start button. This puts the recorder into record readiness. At this time the desired onward call forwarding pulses are recorded. The calling or reprogramming phone has to produce the tone pulses of a standard touch tone telephone or a hand encoder with identical tone pulses.

At the end of transmission of the new telephone number, a transmitted signal, i.e., # (pound) pulse is added by the operator which is reprogramming to stop the recorder by a fourth electronic circuit. Electronic circuit E4 receives an output from sensor 31, which activates solenoid L4 to stop the recorder. Solenoid L2 is also energized to rewind the record.

The device 11 is now reprogrammed for forwarding the new number. Every time a new number is programmed the previous one is automatically erased, as is the case when using a conventional phone answering device using a tape for recording messages.

Referring now to FIG. 3, the first electronic circuit E1 is shown in more detail to include the input line 51 from the timer 42 with a resistor R1 and capacitor C1 connected in series between input line 51 and ground. Transistors Q1 and Q2 are connected in a Darlington configuration with resistor R1 connected between the emitter of transistor Q1 and input line 51 and resistor R4 connected between the base of transistor Q2 and line 51. A resistor R2 is connected between the collector of transistor Q1 and ground and a resistor R3 is connected between the collector of transistor Q2 and ground. A resistor R30 is connected between line 51 and a common connection of the collector of Q2 and base of Q1.

A second stage of the circuit includes transistors Q3, Q4 and Q5 connected to amplify the power produced by the capacitor to energize start solenoids L1 and simulator coil K1. Resistors R6 and R7 connect to the base of transistor Q3 and are connected to the collector of transistor Q1. The emitter of transistor Q3 is connected to ground. Resistors R9 and R10 are connected between a power terminal 52 and the collector of transistor Q3. The base of transistor Q4 connects between resistors R9 and R10. A resistor R8 connects between power terminal 52 and the emitter of transistor Q4. A resistor R50 connects between the collector of transistor Q5 and ground.

The emitter of transistor Q5 connects to power terminal 52 and the solenoid L1 is connected between the collector of transistor Q5 and ground. A diode D3 is connected across start solenoid L1. Another diode D4 is connected between the collector of transistor Q1 and R6. of transistor Q5 and ground includes a diode D1 and coil K1 with a diode D5 connected across coil K1.

The circuitry including transistors Q1, Q2, Q3 and Q4 and associated resistors is enclosed in a block designated by numeral 53. This circuitry is common to electronic circuits E2, E3 and E4 described hereinafter.

In the operation of circuit E1, when the ring detector 27 turns on, then timer 42 turns on for about one second. Timer 42 connects the voltage from the power supply 38 indicated at terminal 55 via line 51 to resistors R1, R4 and R30. Capacitor C1 now charges in readiness for use. At the end of the timing interval the bias voltage applied through timer 42 to line 51 is removed.

Because of the charge on capacitor C1 at the collectors of transistors Q1 and Q2 and the zero voltage level at the base of transistor Q2, the Darlington configuration of transistors Q1 and Q2 turns on and discharges capacitor C1 across resistors R1, R6 and R7, causing transistor Q3 to turn on for approximately one second. The turning on of transistor Q3 causes transistors Q4 and Q5 to turn on, resulting in the energization of start solenoid L1 and simulator coil K1 via diode D1. Diode D5 across K1 prevents reverse emf spikes from affecting Q5.

Referring now to FIG. 4, electronic circuit E2 is shown to have an input line 61 from timer 44 with a resistor R11 and charging capacitor C2 connected between line 61 and ground. The same electronic circuitry 53 above described is connected between lines 61, resistor R11, capacitor C2, power terminal 62, transistor Q9 and rewind solenoid L2 such that, when capacitor C2 is discharged, solenoid L2 will be energized. A line 95 is shown connected between the output circuits E1 and E2 through diode D2 so that rewind solenoid L2 and coil K1 are activated simultaneously.

A third electronic circuit E3 shown in FIG. 5 has an input line 71 from the associated timer 46 which applies a voltage across a resistor R22 and charging capacitor C3 and, through circuit 53, connects the power from a discharge capacitor C3 to actuate record solenoid L3 by power from terminal 72 via the collector of transistor Q14. The collector of Q14 simultaneously activates start solenoid L1 via diode D4. A diode D8 is shown connected across solenoid L3 to prevent back emf spikes from affecting Q14.

The fourth electronic circuit E4 has an input line 81 directly from sensor 31 connected between resistor R24 and charging capacitor C4 and ground with circuit 53 converting the discharge from capacitor C4 to a signal that will actuate stop solenoid L4. A power terminal for circuit 53 is indicated at 82. A diode D10 is connected across solenoid L4 to prevent back emf spikes from affecting Q15.

The above described embodiment utilizes a mechanical device as the message transmitting and storage device 25. It is understood that an equivalent solid state memory chip could be substituted to provide the same functions. In the electronic device 25 the stop function would not be necessary and the rewind is equivalent to a reset function. The memory chip for device 25 would have the conventional central processing unit with associated memory and timing controls as well as an input-output control for regulating control signals to and from the central processing unit.

A ring detector would connect signals from the phone line to the input-output control, a hook condition device would receive signals from the input-output control and pass them to the phone line, and an input signal detector would be connected to the input-output control and its signals would be routed to the phone line through an input-output switch.

All signals to and from the phone line would be passed through a communication interface that would convert communication level signals into digital level signals for communication with the computer chip.

Although the present invention has been described with a certain degree of particularity, it is understood that the present disclosure has been made by way of example and that changes in details of structure may be made without departing from the spirit thereof.

What is claimed is:

1. A method of automatically forwarding a phone call at a first phone from a second phone to a third phone using a single forwarding phone line to central exchange equipment having an electronic switching system and providing three-way conference services to said first phone, said method comprising the steps of:

storing a phone number of the third phone on a storage medium operatively associated with said forwarding phone line;

detecting a ring produced by a call from the second phone to said first phone; and simulating in response to said ring detection at said first phone, in succession, an offhook condition followed by a first hook flash condition, after which said stored phone number is transmitted with a succeeding hook switch flash being simulated whereby said equipment will connect said second phone to said third phone.

2. A method as in claim 1 further including the step of reprogramming said storage medium with a new number of a third phone wherein said storage medium includes a record mode and a reset mode, said method comprising the step of:

sending a reprogramming message signal including a first tone signal, said new telephone number and second tone signal to successively set the storage medium to the record mode, record the new number and reset the storage medium for receiving another signal.

* * * * *